United States Patent
Hamasaki et al.

(10) Patent No.: US 8,606,013 B2
(45) Date of Patent: Dec. 10, 2013

(54) PAPER SHEET IDENTIFICATION DEVICE AND PAPER SHEET IDENTIFICATION METHOD

(75) Inventors: Hiroki Hamasaki, Hyogo (JP); Tomohiko Kasuya, Hyogo (JP); Kazuhiro Ohmatsu, Hyogo (JP)

(73) Assignee: Glory Ltd., Himeji-shi (JP)

( * ) Notice: Subject to any disclaimer, the term of this patent is extended or adjusted under 35 U.S.C. 154(b) by 1115 days.

(21) Appl. No.: 12/439,369

(22) PCT Filed: Aug. 31, 2006

(86) PCT No.: PCT/JP2006/317233
§ 371 (c)(1),
(2), (4) Date: Feb. 27, 2009

(87) PCT Pub. No.: WO2008/026286
PCT Pub. Date: Mar. 6, 2008

(65) Prior Publication Data
US 2009/0263020 A1     Oct. 22, 2009

(51) Int. Cl.
*G06K 9/46* (2006.01)
*G06K 9/40* (2006.01)
*G06K 9/00* (2006.01)

(52) U.S. Cl.
USPC ............ 382/195; 382/275; 382/135; 382/137

(58) Field of Classification Search
USPC ........................................................ 382/195
See application file for complete search history.

(56) References Cited

U.S. PATENT DOCUMENTS 5,737,440 A * 4/1998 Kunkler ......................... 382/137
5,740,271 A * 4/1998 Kunkler et al. ................ 382/137
(Continued)

FOREIGN PATENT DOCUMENTS

CN    1257373 A    6/2000
EP    1 011 079 A1    6/2000
(Continued)

*Primary Examiner* — David Zarka
(74) *Attorney, Agent, or Firm* — Foley & Lardner LLP

(57) ABSTRACT

A paper sheet identification device that detects a stain on a paper sheet and identifies the stained condition of the paper sheet includes an area memory (12) that stores therein in advance an area where a stain is to be detected on the paper sheet as a target detection area, a pixel number memory (11) that stores therein in advance the number of pixels of an image printed on the target detection area as the reference number of pixels used as a reference value when being compared, an image reading unit (13) that, based on the target detection area stored in the area memory, reads an image on the target detection area from the paper sheet, a pixel-number detection unit (14) that detects the number of pixels in the image read by the image reading unit as the number of read pixels, and a calculation unit (15) that calculates a stain value that indicates a stained condition on the target detection area of the paper sheet, by comparing the number of read pixels detected by the pixel-number detection unit with the reference number of pixels stored in the pixel number memory.

9 Claims, 4 Drawing Sheets

(56) References Cited

U.S. PATENT DOCUMENTS

| | | | |
|---|---|---|---|
| 6,061,088 A * | 5/2000 | Khosravi et al. | 348/169 |
| 6,683,974 B1 * | 1/2004 | Nagasawa et al. | 382/141 |
| 6,741,727 B1 | 5/2004 | Hirasawa | |
| 6,797,974 B2 * | 9/2004 | Philipp et al. | 250/556 |
| 7,162,073 B1 * | 1/2007 | Akgul et al. | 382/149 |
| 8,139,273 B2 * | 3/2012 | Nishikawa | 358/474 |
| 2005/0012967 A1 * | 1/2005 | Okamura | 358/474 |
| 2005/0033695 A1 * | 2/2005 | Minowa | 705/45 |
| 2005/0235846 A1 * | 10/2005 | Ebisawa et al. | 101/128.4 |
| 2006/0022156 A1 * | 2/2006 | Capaldo et al. | 250/559.45 |
| 2008/0230708 A1 * | 9/2008 | Enomoto | 250/370.08 |
| 2010/0034430 A1 * | 2/2010 | Natori | 382/112 |

FOREIGN PATENT DOCUMENTS

| | | |
|---|---|---|
| JP | 59-160284 A | 9/1984 |
| JP | 63-182798 A | 7/1988 |
| JP | 2000-182115 A | 6/2000 |
| JP | 2002-373357 A | 12/2002 |
| JP | 2003-099838 A | 4/2003 |
| JP | 2004-213559 A | 7/2004 |
| WO | WO 02/075673 A1 | 9/2002 |

* cited by examiner

PAPER SHEET IDENTIFICATION DEVICE AND PAPER SHEET IDENTIFICATION METHOD

TECHNICAL FIELD

The present invention relates to a paper sheet identification device and a paper sheet identification method that detect the presence of a stain on a paper sheet.

BACKGROUND ART

When paper sheets such as bills are distributed in the market, it is necessary to only and appropriately distribute bills that are not stained and the like. Accordingly, bills that should be distributed and bills that should not be distributed in the market need to be accurately discriminated, and the bills that should not be distributed need to be collected.

The discrimination between the bills that should be distributed, and the bills to be collected and not to be distributed have been made based on the presence of a tear in the bill, the amount of stain on the printed area of the bill, and the like. However, even if the amount of stain on the entire printed area of the bill is small, some bills should not be distributed in the market. For example, a person may be accused of lese majeste, if he or she scribbles on a portrait portion and the like on the bill in the countries such as Thailand, Malaysia, and Singapore. Accordingly, it has been desired to strictly discriminate the presence of a stain on a predetermined printed area such as a portrait.

A bill serial number reading unit disclosed in Patent document 1 reads a portion where the serial number of the bill is printed, and recognizes a character of each digit of the serial number from image data of the serial number area. The bill serial number reading unit also replaces an unrecognizable character with an error character that indicates a recognition error, adds the error character to the recognized characters, and outputs the recognition result.

Patent document 1: Japanese Patent Application Laid-open No. 2004-213559

DISCLOSURE OF INVENTION

Problem to be Solved by the Invention

With the conventional technology, it is possible to recognize a predetermined character from the serial number area of the bill. However, there is a problem that the presence of a stain such as a scribble on a predetermined printed area of a paper sheet cannot be discriminated.

In view of the above-described problems, the present invention is intended to provide a paper sheet identification device and a paper sheet identification method that can easily detect a stain on a predetermined printed area of a paper sheet.

Means for Solving Problem

A paper sheet identification device according to an aspect of the present invention is for identifying a stained condition of a paper sheet by detecting a stain on the paper sheet, and includes an area memory that stores therein in advance information about an area where a stain is to be detected on the paper sheet as information about a target detection area; a pixel number memory that stores therein in advance a number of pixels in an image printed on the target detection area as a reference number of pixels used as a reference value when being compared; an image reading unit that, based on the information about the target detection area stored in the area memory, reads an image on the target detection area from the paper sheet; a pixel-number detection unit that detects a number of pixels in the image read by the image reading unit as number of read pixels; and a calculation unit that calculates a stain value indicating a stained condition on the target detection area of the paper sheet, by comparing the number of read pixels detected by the pixel-number detection unit and the reference number of pixels stored in the pixel number memory.

The paper sheet identification device may further include a reference-stain-value memory that stores therein in advance a reference stain value used as a reference to determine whether a stain is present, when it is determined whether a stain is present on the target detection area; and a determination unit that, based on the stain value calculated by the calculation unit and the reference stain value stored in the reference-stain-value memory, determines whether a stain is present on the target detection area.

The paper sheet identification device may further include a paper-sheet-type discrimination unit that discriminates a type of the paper sheet, wherein the image reading unit may read an image on the target detection area corresponding to the type of the paper sheet discriminated by the paper-sheet-type discrimination unit from the paper sheet, and the calculation unit may calculate the stain value by comparing the reference number of pixels corresponding to the type of the paper sheet discriminated by the paper-sheet-type discrimination unit and the number of read pixels.

The paper sheet identification device, the determination unit, based on the stain value calculated by the calculation unit and a reference stain value corresponding to the type of the paper sheet discriminated by the paper-sheet-type discrimination unit, may determine whether a stain is present on the target detection area.

In the paper sheet identification device, the target detection area may be an area on the paper sheet where a portrait is drawn.

In the paper sheet identification device, when the image reading unit reads an image corresponding to each target detection area from a plurality of target detection areas, the determination unit may determine whether a stain is present on each of the target detection areas based on importance of each of the target detection areas.

The paper sheet identification device may further include a display unit that displays an identification result of the stained condition of the paper sheet, wherein the display unit may display a determination result of whether a stain is present on the target detection area as the identification result of the stained condition of the paper sheet.

In the paper sheet identification device, the display unit may display the stain value calculated by the calculation unit.

In the paper sheet identification device, the target detection area may be an area set by referring to a print original point on the paper sheet.

A paper sheet identification method according to another aspect of the present invention is for identifying a stained condition of the paper sheet by detecting a stain on a paper sheet, and includes setting in advance an area where a stain is to be detected on the paper sheet as a target detection area and setting in advance number of pixels in an image printed on the target detection area as a reference number of pixels used as a reference value when being compared; reading an image on the target detection area from the paper sheet, based on the target detection area set in advance; a detecting a number of pixels in the read image, as a number of read pixels; and calculating a stain value indicating a stained condition on the target detection area of the paper sheet, by comparing the number of read pixels detected and the reference number of pixels set in advance.

Effect of the Invention

The stained condition on a target detection area of a paper sheet is calculated as a stain value, by comparing the number of pixels in an image on the target detection area, where a stain is to be detected on the paper sheet, and the reference number of pixels stored in advance. Accordingly, it is possible to advantageously and easily detect a stain on the target detection area of a paper sheet.

The presence of a stain on the target detection area is determined, based on a reference stain value used as a reference to determine the presence of a stain and a calculated stain value. Accordingly, it is possible to advantageously and easily determine whether a stain is present on the target detection area of a paper sheet.

An image on the target detection area corresponding to the type of paper sheet is read from a paper sheet, and a stain value is calculated by comparing the reference number of pixels corresponding to the type of paper sheet and the number of read pixels. Accordingly, it is possible to advantageously and easily detect a stain on the target detection area corresponding to the type of paper sheet.

The presence of a stain on the target detection area is determined, based on the calculated stain value and the reference stain value corresponding to the type of paper sheet. Accordingly, it is possible to advantageously and easily determine whether a stain is present on the target detection area corresponding to the type of paper sheet.

The target detection area is an area on a paper sheet where a portrait is drawn. Accordingly, it is possible to advantageously and easily detect a stain on the area where a portrait is drawn.

When an image corresponding to each target detection area is read from a plurality of target detection areas, the presence of a stain on the target detection area is determined, based on the importance of each of the target detection areas. Accordingly, it is possible to advantageously and easily determine based on the importance of each of the target detection areas whether a stain is present.

The determination result of whether a stain is present on the target detection area is displayed as an identification result of the stained condition of paper sheet. Accordingly, it is possible to advantageously and easily notify the determination result of whether a stain is present on the target detection area to a user.

The calculated stain value is displayed. Accordingly, it is possible to advantageously and easily notify the calculated stain value to the user.

The target detection area is set by referring to a print original point on the paper sheet. Accordingly, it is possible to reduce an effect caused by displacement of a printed portion on the paper sheet, when it is determined whether a stain is present on the target detection area. Subsequently, it is possible to advantageously and accurately determine whether a stain is present on a printed area to be detected.

The stained condition of the target detection area of a paper sheet is calculated as a stain value, by comparing the number of pixels in an image on the target detection area where a stain is to be detected on the paper sheet, and the reference number of pixels stored in advance. Accordingly, it is possible to advantageously and easily detect a stain on the target detection area of a paper sheet.

EXPLANATIONS OF LETTERS OR NUMERALS

Figure 1:
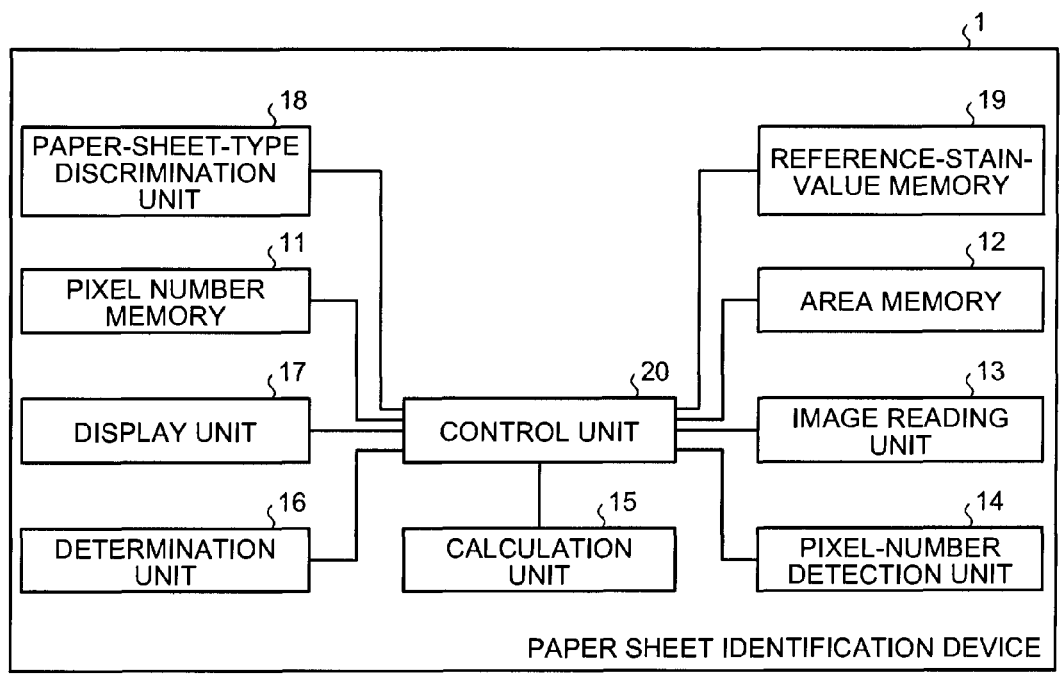
FIG. 1 is a block diagram of a paper sheet identification device according to an embodiment.

1 paper sheet identification device
11 pixel number memory
12 area memory
13 image reading unit
14 pixel-number detection unit
15 calculation unit
16 determination unit
17 display unit
18 paper-sheet-type discrimination unit
19 reference-stain-value memory
20 control unit

BEST MODE(S) FOR CARRYING OUT THE INVENTION

Exemplary embodiments of a paper sheet identification device and a paper sheet identification method of the present invention are described below in greater detail with reference to the accompanying drawings. It is to be understood that the present invention is not limited to the embodiments.

Embodiments

FIG. 1 is a block diagram of a paper sheet identification device according to an embodiment of the present invention. A paper sheet identification device 1 is a device that detects a stain on a paper sheet and identifying the stained condition of the paper sheet. The paper sheet identification device 1 includes a pixel number memory 11, an area memory 12, an image reading unit 13, a pixel-number detection unit 14, a calculation unit 15, a determination unit 16, a display unit 17, a paper-sheet-type discrimination unit 18, a reference-stain-value memory 19, and a control unit 20.

The paper-sheet-type discrimination unit 18 discriminates a type of paper sheet (such as denomination and direction), from an image of a paper sheet (such as a bill, a business card, a gift voucher, and securities) to be identified (an object to determine a stain) read by the image reading unit 13. The paper-sheet-type discrimination unit 18 discriminates the type of paper sheet, for example, based on the pattern, size, and magnetic data of the paper sheet. The paper-sheet-type discrimination unit 18 sends the discrimination result of the type of paper sheet, to the image reading unit 13, the calculation unit 15, and the determination unit 16.

The area memory 12 stores therein an area where the presence of a stain (such as a scribble) is to be detected on the paper sheet (coordinates of an area where an image is printed) (target detection area) (hereinafter, "printed area to be detected"), by the type of paper sheet. The printed area to be detected is set, using a distance (vector) from the print original point (original point within an area where an image is printed on a paper sheet) on the paper sheet. The area memory 12 stores therein, for example, an area of the bill where a portrait is drawn, as the printed area to be detected.

The pixel number memory 11 stores therein the number of pixels in the printed area to be detected (the number of pixels to be referred when the presence of a stain is to be detected) (hereinafter, "reference pixel number"), by the type of paper sheet. The reference-stain-value memory 19 stores therein a reference value used to determine the presence of a stain (hereinafter, "reference stain value"), by the type of paper sheet and/or by the printed area to be detected.

The image reading unit 13 reads an image (such as a bill image) from a paper sheet to be identified, and sends the read image to the paper-sheet-type discrimination unit 18. The image reading unit 13, based on the type of paper sheet (discrimination result) discriminated by the paper-sheet-type discrimination unit 18, extracts a printed area to be detected corresponding to the type of paper sheet, from the area memory 12. The image reading unit 13, based on the printed area to be detected extracted from the area memory 12, extracts and reads an image in the printed area to be detected (such as an image of a portrait area), from a predetermined area of the paper sheet where the presence of a stain is to be detected. The image reading unit 13 includes a sensor that extracts and reads an image from a predetermined area, and extracts and reads an image from the printed area to be detected, using the sensor. The image reading unit 13 reads an image in the printed area to be detected, for example, by using data on visible light reflection.

The pixel-number detection unit 14 includes a sensor (such as a sensor equipped in the image reading unit 13) that detects pixels (such as pixels of a black dot) in an image read by the image reading unit 13 (image in the printed area to be detected). The pixel-number detection unit 14 counts the pixels of a black dot and the like (detects the number of pixels as the number of read pixels). A sensor in the image reading unit 13 (sensor that reads an image) and a sensor in the pixel-number detection unit 14 (sensor that detects the number of pixels) need not be separated, but the image reading unit 13 and the pixel-number detection unit 14 may be provided as one sensor (a sensor is being shared).

The calculation unit 15, based on the type of paper sheet (discrimination result) discriminated by the paper-sheet-type discrimination unit 18, extracts the reference number of pixels depending on the type of paper sheet, from the pixel number memory 11. The calculation unit 15 calculates the difference between the number of pixels counted by the pixel-number detection unit 14 and the reference number of pixels extracted from the pixel number memory 11. The calculation unit 15, based on the calculation result of the difference of the number of pixels, calculates a value that indicates the presence of a stain in the printed area to be detected of a paper sheet (hereinafter, "stain value").

The determination unit 16, based on the type of paper sheet (discrimination result) discriminated by the paper-sheet-type discrimination unit 18, extracts a reference stain value corresponding to the type of paper sheet, from the reference-stain-value memory 19. The determination unit 16 determines, based on the stain value calculated by the calculation unit 15 and the reference stain value extracted from the reference-stain-value memory 19, whether a stain (such as a scribble) is present in the printed area to be detected of the paper sheet.

The display unit 17 outputs the determination result of whether a stain is present determined by the determination unit 16. The display unit 17 includes a display unit such as a liquid crystal monitor, and outputs the determination result of whether a stain is present, by displaying the determination result on the display unit. The control unit 20 controls the pixel number memory 11, the area memory 12, the image reading unit 13, the pixel-number detection unit 14, the calculation unit 15, the determination unit 16, the display unit 17, the paper-sheet-type discrimination unit 18, and the reference-stain-value memory 19.

Figure 2:
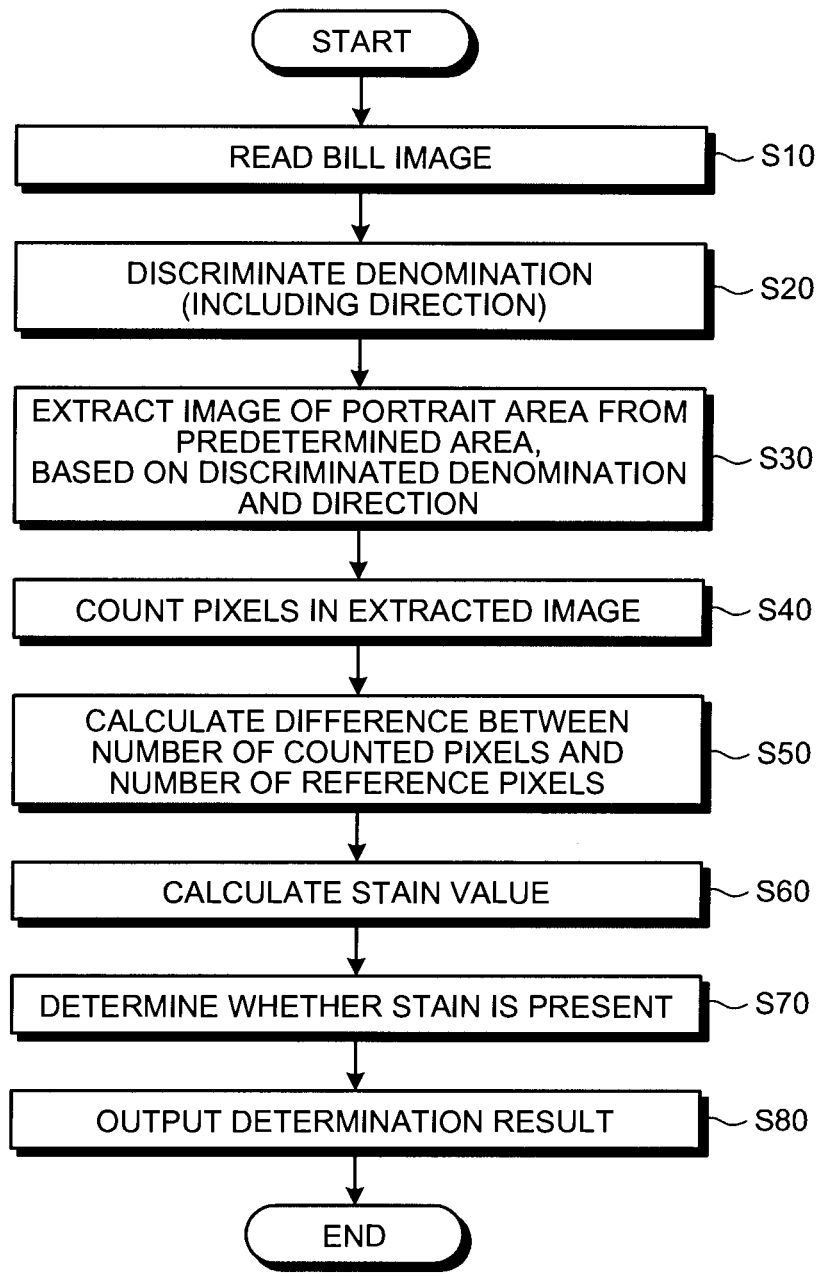
FIG. 2 is a flowchart showing an operation procedure of the paper sheet identification device according to the embodiment.

An operation procedure of the paper sheet identification device according to the embodiment of the present invention will now be described. FIG. 2 is a flowchart showing an operation procedure of the paper sheet identification device according to the embodiment of the present invention.

The image reading unit 13 of the paper sheet identification device 1 reads an image (such as a bill image) of paper sheet from a paper sheet to be identified (paper sheet where the presence of a stain is to be detected) (Step S10). The paper-sheet-type discrimination unit 18 discriminates the denomination (including direction) of the paper sheet, from the bill image read by the image reading unit 13 (Step S20), and sends the discrimination result to the image reading unit 13, the calculation unit 15, and the determination unit 16.

The image reading unit 13, based on the denomination and direction of the paper sheet discriminated by the paper-sheet-type discrimination unit 18, extracts a printed area to be detected corresponding to the type of paper sheet, from the area memory 12. The image reading unit 13, based on the printed area to be detected (coordinates) extracted from the area memory 12, extracts and reads an image in the printed area to be detected (such as an image of a portrait area), from a predetermined area of the paper sheet (such as a bill) (Step S30).

Figure 3:
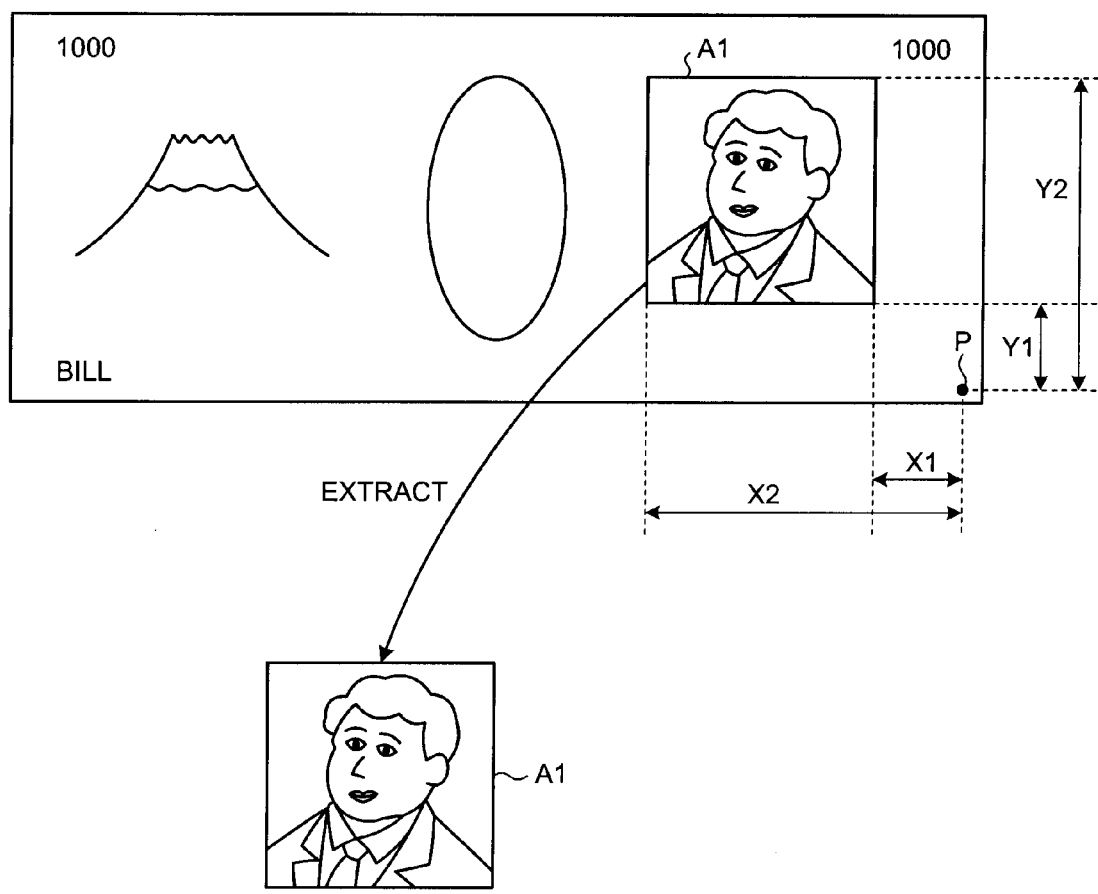
FIG. 3 is a schematic for explaining a process of extracting an image.

A process of extracting an image in the printed area to be detected will be described in detail below. FIG. 3 is a schematic for explaining a process of extracting an image. As shown in the schematic, a printed area to be detected (such as an area where a portrait is drawn) A1 where the presence of a stain (such as a scribble) is to be detected on the bill is stored in the area memory 12, by the type of bill. The area A1, for example, is set by using a distance from a print original point P on the paper sheet, and the print original point P (position) and a vector. Accordingly, the image reading unit 13 detects the print original point P (print edge) and performs correction by using the print original point P as an original point for reading the image (zero point correction). The area A1 is extracted by referring to the print original point P.

An X direction (horizontal direction of the bill) of the area A1 is set to a distance X1 to a distance X2 from the print original point P, and a Y direction (vertical direction of the bill) of the area A1 is set to a distance Y1 to a distance Y2 from the print original point P. Therefore, after detecting the print original point P, the image reading unit 13 reads the image in the area A1 (a area surrounded by (X1, Y1), (X1, Y2), (X2, Y1), and (X2, Y2)). The pixel-number detection unit 14, for example, detects a black dot from an image in the print area to be detected read by the image reading unit 13, and counts the pixels of the black dot (Step S40).

The calculation unit 15, based on the type of paper sheet (discrimination result) discriminated by the paper-sheet-type discrimination unit 18, extracts the reference number of pixels corresponding to the type of paper sheet, from the pixel number memory 11. The calculation unit 15 calculates the difference between the number of pixels counted by the pixel-number detection unit 14 and the reference number of pixels extracted from the pixel number memory 11 (Step S50), and calculates a stain value of the paper sheet, based on the calculation result (Step S60). The stain value, for example, is the difference between the number of pixels counted by the pixel-number detection unit 14 and the reference number of pixels extracted from the pixel number memory 11, and a value related to the presence of a stain in the printed area to be detected. The greater the stain value, the more stained the image in the printed area to be detected. In other words, when there is a scribble on the area of the bill where a portrait is drawn, the number of pixels in the printed area to be detected increases, thereby increasing the stain value.

The determination unit 16, based on the type of paper sheet discriminated by the paper-sheet-type discrimination unit 18 (discrimination result), extracts a reference stain value corresponding to the type of paper sheet, from the reference-stain-value memory 19. The determination unit 16, based on the stain value calculated by the calculation unit 15 and the reference stain value extracted from the reference-stain-value memory 19, determines whether a stain (such as a scribble) is present in the printed area to be detected of the paper sheet (Step S70).

The determination unit 16, for example, determines that a stain is present in the printed area to be detected, when the difference between the stain value calculated by the calculation unit 15 and the reference stain value set in advance, is larger than a predetermined value. The determination unit 16 determines that there is no stain in the printed area to be detected, when the difference between the stain value calculated by the calculation unit 15 and the reference stain value set in advance, is equal to or less than the predetermined value.

The display unit 17 outputs the determination result of whether a stain is present determined by the determination unit 16. The display unit 17, for example, displays the determination result on a display unit such as a liquid crystal monitor (Step S80).

The display unit 17, as the determination result of whether a stain is present in the printed area to be detected, may display the stain value calculated by the calculation unit 15. Accordingly, a user of the paper sheet identification device 1 can judge whether a stain is present in the printed area to be detected. In this case, there is no need to set a reference stain value in advance in the paper sheet identification device 1.

It is also possible to display the reference stain value set in advance with the stain value calculated by the calculation unit 15. Accordingly, the user of the paper sheet identification device 1 can easily judge whether a stain is present in the printed area to be detected, based on the reference stain value.

It is also possible to store an image in the printed area to be detected read by the image reading unit 13 in a predetermined memory, with the stain value calculated by the calculation unit 15. Accordingly, based on the performance of scribble on an image, an appropriate reference number of pixels and a reference stain value can be reset in the paper sheet identification device 1.

It is also possible to read a serial number of the paper sheet by the image reading unit 13, and store therein the serial number read by the image reading unit 13 in correlation with the stain value calculated by the calculation unit 15. Accordingly, it is possible to notify the user which paper sheet has which stain value.

In the embodiment, it is determined whether a stain (scribble) is present in the entire area (area A1) where a portrait is drawn, for example, as a printed area to be detected. However, the printed area to be detected may be set based on the tendency of the scribble.

Figure 4:
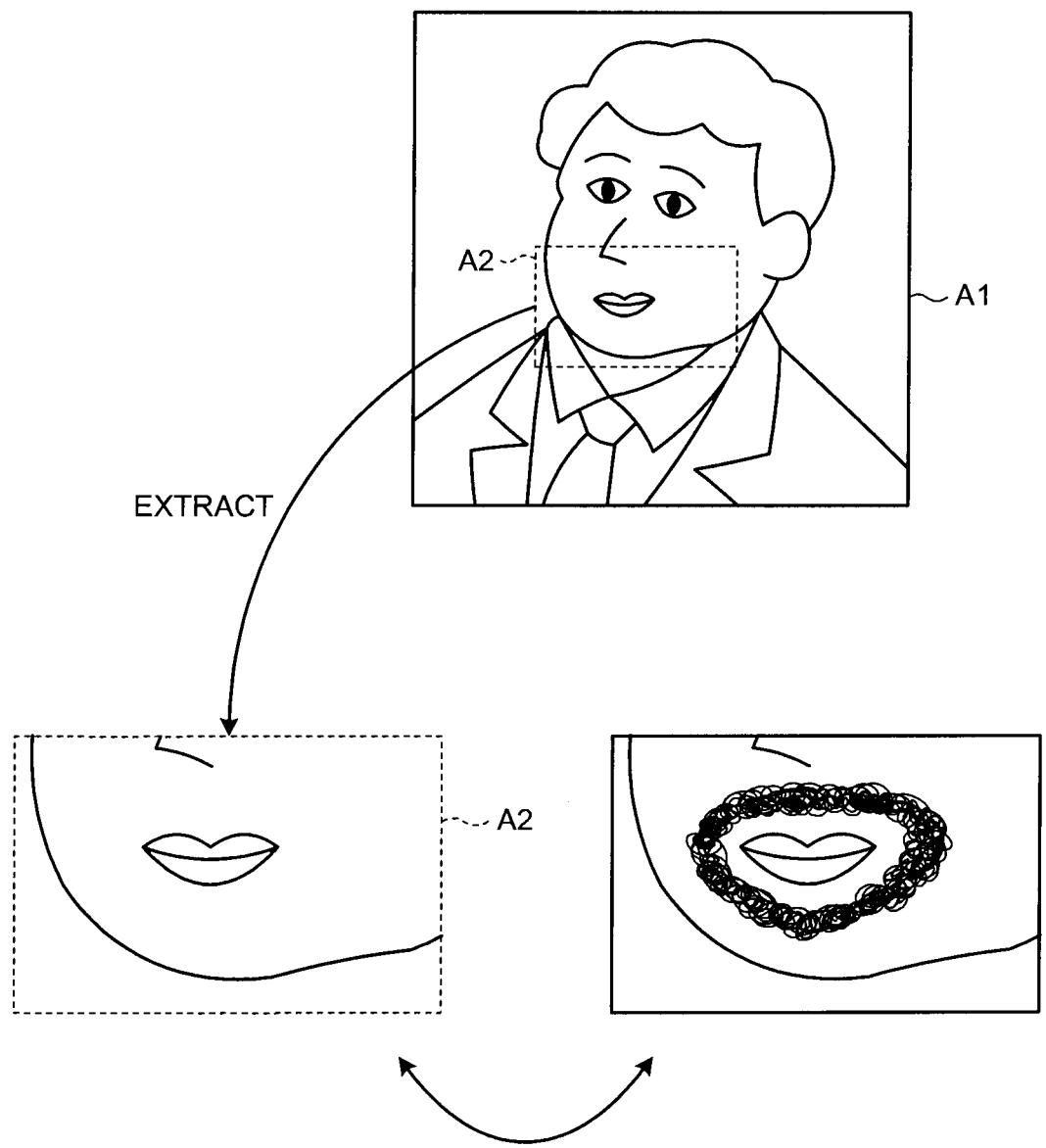
FIG. 4 is a schematic for explaining an area where the presence of a stain is determined, based on the tendency of the scribble.

FIG. 4 is a schematic for explaining a setting of the printed area to be detected based on the tendency of the scribble. For example, there is a tendency that a mustache is drawn on a face (portrait) as a scribble. Accordingly, it is possible to set the printed area to be detected, by limiting to an area where a mustache may be drawn on a face.

When an area to detect the presence of a stain is limited based on the tendency of the scribble, for example, with respect to the entire area where the portrait is drawn (area A1), an area where a scribble may be drawn (area A2) will be set. The paper sheet identification device 1 determines the presence of a stain (scribble) in the area where scribble may be drawn (area A2). Accordingly, it is possible to precisely determine whether a stain is present, according to the tendency of the scribble.

The printed area to be detected is not limited to an area on the paper sheet where a portrait is drawn, but may be set on the other printed area other than the area where the portrait is drawn. For example, the printed area to be detected may be set to the entire printed area on a paper sheet.

In the embodiment, the printed area to be detected is set at one location per paper sheet. However, the printed area to be detected may be set at a plurality of locations on the paper sheet. In this case, the paper sheet identification device 1 determines the presence of a stain in each of the printed areas to be detected. The printed areas to be detected at the plurality of locations may be set on the same surface (front surface or rear surface) on the paper sheet, or may be set at both the front surface and the rear surface.

When the printed area to be detected is set at the plurality of locations on the paper sheet, the pixel number memory 11, the area memory 12, and the reference-stain-value memory 19 store therein the reference number of pixels, the printed area to be detected, and the reference stain value for each of the printed areas to be detected. The image reading unit 13, the pixel-number detection unit 14, the calculation unit 15, and the determination unit 16 count the pixels by reading an image in each of the printed areas to be detected, and determine whether a stain is present by calculating the stain value. At this time, the display unit 17 may output an indication of whether a stain is present for each of the printed areas to be detected, or may output an indication of whether a stain is present for each paper sheet.

When the printed area to be detected is set at the plurality of locations on the paper sheet, the stains may be determined and weighed depending on the importance of the printed area to be detected, for each of the printed areas to be detected. For example, when the printed area to be detected is set at two locations, a doubled stain value of one location and a stain value of the other location are added, and by comparing the added stain value and the reference stain value, it is determined whether a stain is present. Accordingly, the stain in the important location in the printed area to be detected can be determined precisely.

In the embodiment, the pixel-number detection unit 14 counts the pixels of a black dot (the number of black pixels) in an image read by the image reading unit 13. However, it is also possible to count the pixels of color (such as red, green, and blue) other than black, from the image read by the image reading unit 13. In this case, the number of pixels of the color other than black is stored in the pixel number memory 11, as the reference number of pixels in the printed area to be detected. Then, by using the reference number of pixels of the color other than black, the stain value is calculated and the presence of a stain is determined. It is also possible to count the pixels of a plurality of colors from the image read by the image reading unit 13. In this case, the number of pixels of the plurality of colors is stored in the pixel number memory 11, as the reference number of pixels in the printed area to be detected. By using the reference number of pixels of the plurality of colors, the stain value is calculated and it is determined whether a stain is present.

In the embodiment, for example, the stain value is the difference between the number of pixels counted by the pixel-number detection unit 14 and the reference number of pixels extracted from the pixel number memory 11. However, the stain value may be calculated using the other methods. For example, the calculation unit 15 may set the stain value to a value obtained by dividing the difference between the number of pixels counted from the paper sheet and the reference number of pixels, by the reference number of pixels (ratio of the difference of the number of pixels with respect to the reference number of pixels). The calculation unit 15 may also set the stain value to a value obtained by dividing the difference between the number of pixels counted from the paper sheet and the reference number of pixels, by the number of counted pixels (ratio of the difference of the number of pixels with respect to the number of counted pixels). The calculation unit 15 may also set the stain value to the proportion between the number of pixels counted from the paper sheet and the reference number of pixels.

In the embodiment, it is determined whether a stain is present based on the difference between the stain value calculated by the calculation unit 15 and the reference stain value set in advance. However, it is also possible to determine whether a stain is present based on the proportion between the stain value calculated by the calculation unit 15 and the reference stain value set in advance.

In the present embodiment, the paper sheet identification device 1 includes the paper-sheet-type discrimination unit 18, and the paper-sheet-type discrimination unit 18 discriminates the type of paper sheet in which whether a stain is present is to be determined. However, the paper sheet identification device 1 may not include the paper-sheet-type discrimination unit 18. In this case, a user of the paper sheet identification device 1 sends the type of paper sheet to the paper sheet identification device 1 (information input unit such as a mouse, a keyboard, and a button). The type of paper sheet entered by the user is sent to the image reading unit 13, the calculation unit 15, and the determination unit 16. Accordingly, even if the paper sheet identification device 1 does not include the paper-sheet-type discrimination unit 18, the paper sheet identification device 1 can determine whether a stain is present in the printed area to be detected based on the type of paper sheet.

In this manner, according to the embodiment, it is possible to calculate the stain value (value that indicates whether a stain is present) of the printed area to be detected, based on the number of pixels in an image read by the image reading unit 13 and the reference number of pixels. It is also possible to easily determine whether a stain (such as a scribble) is present in the printed area to be detected, based on the calculated stain value and the reference stain value.

The image reading unit 13 reads an image in the printed area to be detected and the pixel-number detection unit 14 counts the pixels in the image. Accordingly, it is possible to easily obtain the number of pixels in the printed area to be detected using a simple configuration, corresponding to the resolution of the sensor that detects the number of pixels. Subsequently, it is possible to easily determine whether a stain is present in the printed area to be detected.

The stain value is calculated by using the number of pixels of the black dot and the like (added value of data determined as black pixels), thereby determining whether a stain is present. Accordingly, it is possible to easily determine whether a stain is present in the printed area to be detected.

The printed area to be detected (area A1) is set by referring to the print original point P on the paper sheet, and the printed area to be detected (area A1) is detected by referring to the print original point P from the paper sheet. Accordingly, it is possible to reduce the effect caused by displacement of a printed portion on the paper sheet, when it is determined whether a stain is present in the printed area to be detected. Therefore, it is possible to more accurately determine whether a stain is present in the printed area to be detected, than when it is determined whether a stain is present in the printed area to be detected, by referring to the edge portion of the paper sheet.

INDUSTRIAL APPLICABILITY

In this manner, the paper sheet identification device and the paper sheet identification method according to the present invention can advantageously detect the presence of a stain on a paper sheet.

The invention claimed is:

1. A paper sheet identification device for identifying a stained condition of a paper sheet by detecting a stain on the paper sheet, the paper sheet identification device comprising:
   an area memory that stores therein in advance information about a target detection area where it is to be detected whether a stain is present on the paper sheet;
   a pixel number memory that stores therein in advance a number of pixels of an image printed on the target detection area as a reference number of pixels;
   a paper-sheet-type discrimination unit that discriminates a type of the paper sheet;
   an image reading unit that reads, from the paper sheet, an image on the target detection area selected based on the type of the paper sheet discriminated by the paper-sheet-type discrimination unit;
   a pixel-number detection unit that detects a number of pixels in the image read by the image reading unit as a number of read pixels;
   a calculation unit that calculates a stain value, indicating a stained condition on the target detection area of the paper sheet, by comparing the number of read pixels detected by the pixel-number detection unit and the reference number of pixels stored in the pixel number memory, the reference number of pixels selected based on the type of the paper sheet discriminated by the paper-sheet-type discrimination unit.

2. The paper sheet identification device according to claim 1, further comprising:
   a reference-stain-value memory that stores therein in advance a reference stain value used as a reference to determine whether a stain is present; and
   a determination unit that, based on the stain value calculated by the calculation unit and the reference stain value stored in the reference-stain-value memory, determines whether a stain is present on the target detection area.

3. The paper sheet identification device according to claim 2, wherein, when the image reading unit reads an image on each of a plurality of target detection areas, the determination unit determines whether a stain is present on the paper sheet depending on an importance of each of the plurality of target detection areas.

4. The paper sheet identification device according to claim 1, further comprising:
   a determination unit that, based on the stain value calculated by the calculation unit and a reference stain value based on the type of the paper sheet discriminated by the paper-sheet-type discrimination unit, determines whether a stain is present on the target detection area.

5. The paper sheet identification device according to claim 1, wherein the target detection area is an area on the paper sheet where a portrait is drawn.

6. The paper sheet identification device according to claim 1, further comprising:
   a display unit that displays an identification result of the stained condition of the paper sheet, wherein
   the display unit displays a determination result of whether a stain is present on the target detection area as the identification result of the stained condition of the paper sheet.

7. The paper sheet identification device according to claim 6, wherein the display unit displays the stain value calculated by the calculation unit.

8. The paper sheet identification device according to claim 1, wherein the target detection area is an area set by referring to a print original point on the paper sheet.

9. A paper sheet identification method for identifying a stained condition of a paper sheet by detecting a stain on the paper sheet, the paper sheet identification method comprising:

setting in advance an area where it is to be detected whether a stain is present on the paper sheet as a target detection area and setting in advance a number of pixels of an image printed on the target detection area as a reference number of pixels;

discriminating a type of the paper sheet;

reading an image on the target detection area, the target detection area selected based on the type of the paper sheet discriminated from the paper sheet;

detecting a number of pixels in the read image, as a number of read pixels; and calculating a stain value indicating a stained condition on the target detection area of the paper sheet, by comparing the number of read pixels detected and the reference number of pixels, the reference number of pixels selected based on the type of the paper sheet discriminated.

* * * * *